(12) United States Patent
Sanders et al.

(10) Patent No.: US 7,301,920 B2
(45) Date of Patent: Nov. 27, 2007

(54) SYSTEM AND METHOD FOR IDENTIFYING CO-CHANNEL INTERFERENCE IN A RADIO NETWORK

(75) Inventors: Alan David Sanders, Atlanta, GA (US); Perry Simon Lewars Linder, Chevy Chase, MD (US); Dhaval Dave', Atlanta, GA (US)

(73) Assignee: Telecom Network Optimization, Inc., Atlanta, GA (US)

( * ) Notice: Subject to any disclaimer, the term of this patent is extended or adjusted under 35 U.S.C. 154(b) by 983 days.

(21) Appl. No.: 10/694,449

(22) Filed: Oct. 27, 2003

(65) Prior Publication Data

US 2004/0132457 A1    Jul. 8, 2004

Related U.S. Application Data

(60) Provisional application No. 60/421,397, filed on Oct. 25, 2002.

(51) Int. Cl.
  *H04Q 7/00*    (2006.01)
(52) U.S. Cl. ........................ 370/328; 370/332; 370/350
(58) Field of Classification Search ................ 370/328, 370/329, 332, 333, 341, 337, 347, 350, 431, 370/442, 503; 455/422.1, 501–506
See application file for complete search history.

(56) References Cited

U.S. PATENT DOCUMENTS

| 5,907,558 | A | 5/1999 | Watanabe |
| 5,909,433 | A | 6/1999 | Haartsen |
| 5,940,380 | A | 8/1999 | Poon et al. |
| 6,122,327 | A | 9/2000 | Watanable et al. |
| 2003/0026242 | A1* | 2/2003 | Jokinen et al. ............. 370/350 |
| 2004/0166809 | A1* | 8/2004 | Dickey .................... 455/67.11 |
| 2005/0059390 | A1* | 3/2005 | Sayers et al. ............... 455/425 |
| 2006/0153145 | A1* | 7/2006 | Voyer et al. ................ 370/335 |
| 2007/0161407 | A1* | 7/2007 | Hovers et al. ........... 455/562.1 |

* cited by examiner

*Primary Examiner*—Ajit Patel
(74) *Attorney, Agent, or Firm*—Troutman Sanders LLP; James E. Schutz; Ryan A. Schneider

(57) ABSTRACT

The present invention is directed toward a system and method for identifying co-channel interference in a radio network. In an exemplary method according to the present invention, a first stream of transmission data having a first received signal frequency at a first reception location for a first period of time is received. Further, the first signal frequency of the first stream of transmission data is identified. Then the transmission data is correlated against a signal template to identify a first FCCH burst frame. Then, first FCCH time data corresponding to the first FCCH burst frame is identified and the signal frequency of the first stream of transmission data and the first FCCH time data is compared to a reference file to determine one or more probable transmission cells.

22 Claims, 16 Drawing Sheets

*Fig. 14*

| 3 TB | 58 bit data | 26 bit training sequence | 58 bit data | 3 TB |
|---|---|---|---|---|

SYSTEM AND METHOD FOR IDENTIFYING CO-CHANNEL INTERFERENCE IN A RADIO NETWORK

CROSS REFERENCE TO RELATED APPLICATION AND CLAIM OF BENEFIT

This application is based on and claims the priority date of U.S. Provisional Application Ser. No. 60/421,397, entitled "SYSTEM AND METHOD FOR IDENTIFYING CO-CHANNEL INTERFERENCE INA RADIO NETWORK", filed on Oct. 25, 2002, which is incorporated by reference in its entirety as if fully set forth herein.

TECHNICAL FIELD

The present invention relates to the field of telecommunication network design and analysis, and in particular, the optimization and planning of frequency reuse based telecommunication networks by performing a signal presence analysis.

BACKGROUND OF THE INVENTION

The origins of mobile radio telephony extend as far back as the early 1920's when the Detroit Police Department instituted a police dispatch system using a frequency band near 2 Mhz. This early system was such a huge success that the channels in the allocated bandwidth were soon filled to capacity. It quickly became necessary for the Federal Communications Commission ("FCC") to open additional channel capacity. In 1934 the FCC responded by opening up channel capacity in the 30-40 MHz range. By the early 1940's, a large number of law enforcement and emergency agencies were utilizing mobile radios. In the late 1940's, the FCC made mobile radio service available to the private sector.

These early systems were based on a single, high-powered transmitter-receiver servicing a single geographic area. Each channel within the system could only support a single conversation at a time. With the popularity of the service and the limited number of channels available for a given area, the quality of service was not acceptable—especially in the law enforcement and emergency service sectors. Finally, in the 1970's, the FCC in cooperation with industry leaders, developed a system architecture which gave birth to today's cellular telephony systems.

A cellular telephony system is a high-capacity, mobile radio system in which the frequency spectrum is divided into discrete channels which are assigned in groups to small geographic regions. A cellular transmitter-receiver within a geographic region communicates with cellular radios within the same geographic region using the discrete channels assigned to that geographic region. A key aspect of cellular telephony systems is that the transmitted power of the signals on a cellular channel are limited so as to enable the re-use or reassignment of the cellular channels to another geographic region that is a minimum distance away from other geographic regions using the same cellular channels.

Today, several competing cellular telephony standards are in operation as well as development. Some of these systems include the Analog Mobile Phone System (AMPS), Narrowband Analog Phone System (N-AMPS), TDMA, GSM, CDMA, Edge, 3G, and PCS. Although the technology utilized in each of these systems can be quite varied, a common problem that arises is the optimization and layout of the cellular network.

A cellular telephony system divides a service area into a series of geographic regions or cells. Within each geographic region, a transmitter-receiver tower is established to cover that geographic region. Much research and testing has been performed in identifying optimal design for cellular systems. The utilization of bandwidth within a cellular system is maximized by maximizing the reassignment of the cellular channels within the system. However, reusing cellular channels without having enough geographic separation may result in co-channel interference. To minimize co-channel interference, the reassignment of cellular channels within a system must be minimized. Thus, there is a need in the art for a system and a method for optimizing the configuration of a cellular telephony system that balances the minimization of co-channel interference with the maximization of bandwidth utilization.

In an ideal situation, the most optimal structure is to use hexagonal shaped cells that have an axis included to each other at a sixty degree angle. Given particular cell sizes and transmit powers for each transmitter-receiver, the distance necessary to separate cells that utilize the same set of cellular channels can easily be calculated. However, once you step away from the chalk board and enter the real world, one that is plagued by buildings, foliage, humidity, uneven terrain, and a host of other parameters, the chalk board calculations don't always provide optimum performance of the cellular telephony system. It would be exceedingly difficult to attempt to optimize the layout of a cellular system based on each of the possible parameters that effect its operation on paper. Thus, to optimize the layout of a cellular system, it is necessary to take signal measurements in the field. However, this can also be a tremendous task depending on the size of the cellular system, the terrain, and the resources available to the system operator. Thus, there is a need in the art for a system and a method to simplify the task of obtaining and analyzing field signal measurements of a cellular system.

As previously mentioned, optimizing a cellular system includes limiting co-channel interference. A problem associated with signal measurements taken in the field is distinguishing between valid channels and interfering channels. If the source of a signal cannot be identified (i.e., the transmitting cell tower) then the determination of co-channel interference cannot be accomplished. Thus, there is a need in the art for a system and a method for identifying interference problems due to co-channel interference within a cellular telephony system.

A current technique that is being employed by service providers of cellular systems includes performing a drive test within the footprint of the cellular system to measure the received signal strength at various locations within the cellular system. In addition, the service provider predicts the performance of the cellular system using a network model, typically based on mathematical analysis. Invariably the measured and predicted performance characteristics of the system are different. The service providers then perform adjustments to the system to improve the performance. They utilize these adjustments as inputs into the performance prediction process to determine the improvements in the performance of the cellular system. Any performance improvements identified during this analysis are assumed to be proportionately attributed to the measured performance of the system. This type of system is very prone to error. The average error for systems utilizing similar methodologies range from 9 to 12 dB. While this is marginally acceptable for a non-operating network, it is completely unacceptable for a system that is currently in operation. GSM networks, in normal operation, involve operation changes which may affect the network performance. Despite this, this corrected predicted data is still the main input for the frequency planning and capacity maximization process.

Thus, although this technique may result in providing some performance enhancements to the cellular system, the improvements are uncertain, unverified, and inaccurate. Thus, there is a need in the art for a system and method to more accurately ascertain the actual operational characteristics of a cellular system before and after performing optimization adjustments.

Dedicated communication channels within a GSM system are managed through a time division multiplexing technique. The GSM standard defines traffic channels (TCH) that are used to carry information intended for a user. Each traffic channel is associated with another channel used for signaling. It also is a dedicated channel is called the slow associated control channel (SACCH). Three broadcast channels are available in the GSM system. The broadcast control channel (BCCH) is used to send various system parameters to all mobile stations. These parameters include the operator identities, the location of the cell, the name of the cell, frequency information, and the like. The frequency correction channel (FCCH), is used by the base station to give the mobile station information about frequency references and is used for a frequency correction burst. The synchronization channel (SCH) is used by the base station to provide the mobile station synchronization training sequences. Further details regarding the GSM specification are disclosed in the detailed specification.

Therefore, it is apparent that there is a need in the art for a system and a method for analyzing the efficiency of the current configuration of a cellular system and identifying optimization changes for a cellular telephony system to maximize the bandwidth and minimize the co-channel interference.

Furthermore, it is generally accepted that propagation prediction algorithms, which have existed since before the advent of cellular telephone, are not very accurate. This inaccuracy manifests itself in form of poor quality, caused by interference, and sub optimal capacity, caused by excessively restrictive reuse used as hedge against the known prediction inaccuracies. If existing propagation models were very accurate then optimal frequency plans could easily be made. Until now there has not been hardware capable of making measurements comprehensive enough to replace the predictive models. Accordingly, there is a need in the art for a system providing hardware capable of making measurements comprehensive enough to replace predictive models.

In the past, some operators have resorted to creating special frequency plans with one unique carrier assigned to each sector. With a unique carrier, it is simple to determine the source of signals because there is only one sector using each carrier. Although these measurements work from an engineering point of view, the disruption to the network exceeds the benefit of implementation. Thus, there is a need in the art for a system and method of taking system measurements without disrupting the ongoing network operation.

In order to overcome the deficiencies of propagation models GSM operators have resorted to odd strategies to augment their prediction models. Because the propagation model method of measurement is not practical, some GSM operators have performed signal level measurement testing with hardware that is designed to decode the Base Station Identity Code (BSIC) in GSM. While this does provide some useful location based information it tells the operator very little about the potential of the network because these receivers cannot distinguish signals in the presence of even a little interference.

Another method GSM operators employ to improve their frequency planning is to collect mobile reported signal data that is reported to the switch. Again this method does provide some useful information, however it has two serious drawbacks. First it requires a long time and many changes of frequency plan to build up a usable network map. Second even though this procedure may improve frequency planning, it does not geographically locate the interference and thus gives no specific information on how to solve or optimize areas with poor performance. Thus, there is a need in the art for providing a system and method for frequency planning that improves performance in most geographic areas in the region.

SUMMARY OF THE INVENTION

The present invention overcomes the limitations in the prior art by providing systems and methods for identifying co-channel interference in a radio network. In an exemplary method according to the present invention, a first stream of transmission data having a first received signal frequency at a first reception location for a first period of time is received. Further, the first signal frequency of the first stream of transmission data is identified. Then the transmission data is correlated against a signal template to identify a first FCCH burst frame. Then, first FCCH time data corresponding to the first FCCH burst frame is identified and the signal frequency of the first stream of transmission data and the first FCCH time data is compared to a reference file to determine one or more probable transmission cells.

BRIEF DESCRIPTION OF THE DRAWINGS

FIG. 14 illustrates the training sequences for normal bursts in accordance with an exemplary embodiment of the present invention.

DETAILED DESCRIPTION

One aspect of the present invention is a wireless communication test set (WCTS) that is capable of receiving and processing signals over a wide frequency tuning range, as well as for a variety of cellular air interface protocols. Advantageously, this aspect of the present invention improves the ability to receive signals within a cell and analyze the signal for co-channel interference.

Now turning to the figures where like numbers refer to like elements throughout the several views, various embodiments and aspects of the present invention will be described in more detail. Although the present invention may be applied within a variety of cellular systems having varying technology, the present invention will by primarily described as operating within a GSM cellular network. Any variants that are necessary to utilize the present invention within a different cellular network are also described.

Figure 1:
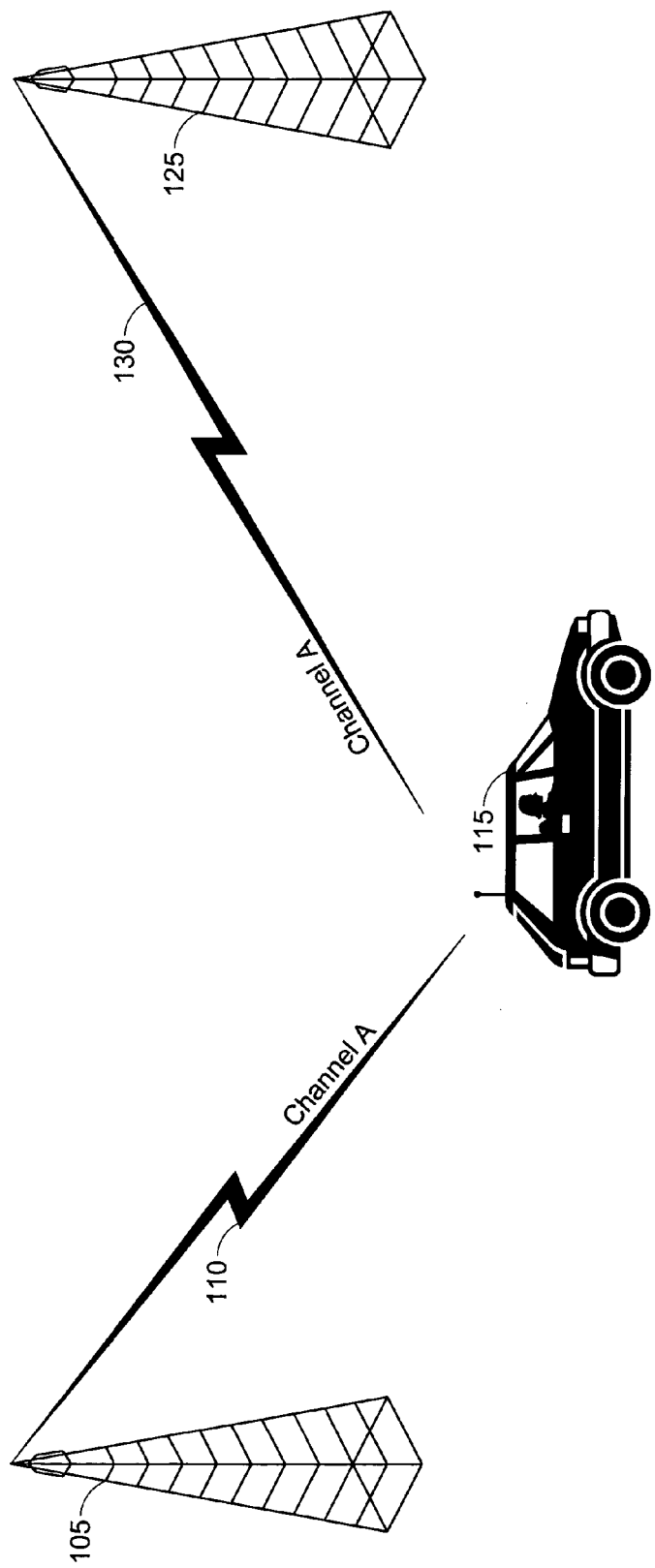
FIG. 1 is a system diagram illustrating co-channel interference within a cellular telephony system.

FIG. 1 is a system diagram illustrating co-channel interference within a cellular telephony system. A first cellular transmitter-receiver (cell site) 105 transmits information on one if its assigned cellular channels (channel A) 110 to a cellular receiver 115 within the geographic region 120 covered by the first cell site 105. During operation, the cellular receiver 115 will lock onto channel A and receive the transmitted information. However, if the system operator assigns the same channel A to a second cell site 125, the transmitted signal 130 from the second cell site 125 may interfere with the signal 110 of the first cell site 105. Although the cellular receiver 115 may be capable of locking onto the signal 110 from the first cell site 105, the signal 130 from the second cell site 125 may result in corrupting the information received by the cellular receiver 115. In this situation, the service operator for the cellular system should reduce the potential co-channel interference. This can be accomplished in several methods including, but not limited to, decreasing the radiated power of the second cell site 125 for channel A, removing channel A from the list of channels for the second cell site 125, redirecting the signal 130 transmitted by the second cell site 125 by using sectoring techniques or adjusting the aim of the antenna.

Figure 2:
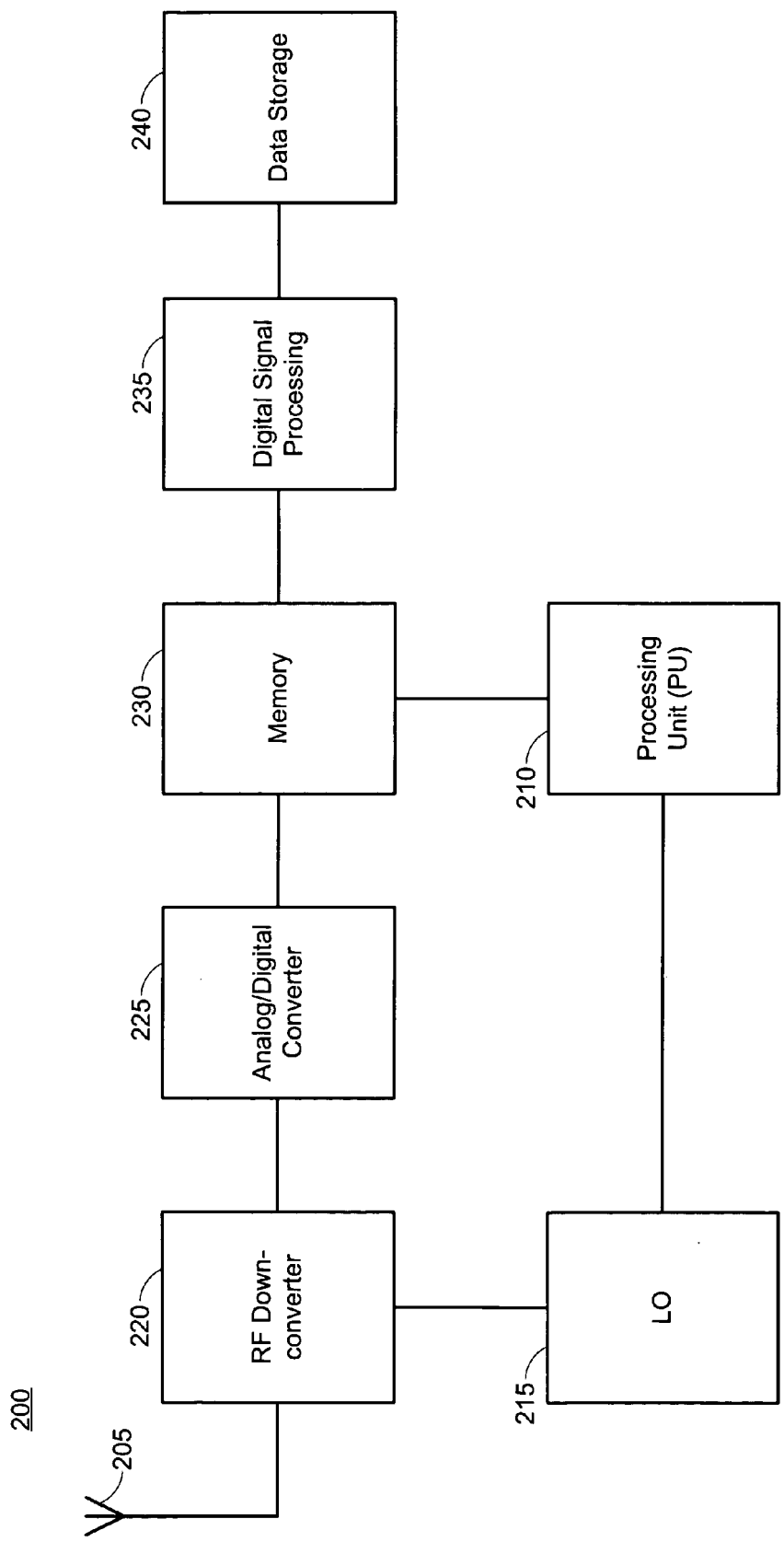
FIG. 2 is a block diagram illustrating the components included in the wireless communication test set (WCTS) aspect of the present invention.

Exemplary embodiments of the present invention allows the signal properties of an entire cellular system to be characterized and analyzed for co-channel interference. FIG. 2 is a block diagram illustrating the components included in the wireless communication test set (WCTS) aspect of the present invention. The WCTS is a data collection tool that measures the received signal energy or spectral power density and signal characteristics at a particular location. The WCTS is preferably capable of receiving and processing signals over a wide frequency tuning range, as well for a variety of cellular encoding techniques (e.g., AMPS, GSM, CDMA (IS-95), TDMA (IS-136) and PCS (PCS1900) ).

The WCTS 200 receives signal energy at antenna 205. A processing unit 210 controls the overall operation of the WCTS 200. One operation of the processing unit 210 is to tune a local oscillator (LO) 215 to a particular frequency. The LO 215 controls the signal selectivity of a radio frequency (RF) down converter 220. An exemplary RF down converter 220 receives the RF signal energy from the antenna and down converts it to an intermediate frequency (IF) of 10 MHz that is ban-limited to 10 MHz. The 10 MHz wide signal should contain fifty (50) GSM carriers, each of which have a bandwidth of approximately 270 kHz and a carrier spacing of 200 kHz. The IF is passed to an analog to digital converter 225 to digitize the signal. The digitized signal is then stored into a memory storage element 230. A digital signal processor 235 is used to process the collected information to extract system characteristic data which is then stored into a data storage element 240.

Utilizing the WCTS, extensive drive test data may be collected. This data is then used in the analysis of the cellular system. The present invention may also use predictive methods in conjunction with the drive test data. For instance, the effect of changes in antenna configuration, antenna models, or output power levels to any sector at any particular point in the network, can be estimated by calculating a predictive delta in the dB for that point between the original configuration and the new configuration. This delta can then be applied to the test drive data to accurately model the effect of these changes. In addition, as input to the analysis of the cellular system, the longitude and latitude of the various transmitters are known. Each of the measurements made by the WCTS are stored with longitude and latitude information. When measuring signals close to a base station, the longitude and latitude measurements provide verification that the measured signal is coming from the base station. However, when measuring signals at a substantial distance from any of the base stations in the system, the longitude and latitude information does not provide such verification. In these situations, timing information extracted from the recorded signals are used to determine which base station transmitted the signal. For example, the timing of FCCH signals are indicative of the transmitting base station as the FCCH signal is consistently broadcast in specific time slots.

This is a highly accurate method for predicting the effect of optimization changes in a cellular network before the changes are actually performed. This method is especially useful in analyzing large scale RF configuration changes as part of the capacity maximization effort. Also, in using the test drive data as a basis for determining channel reuse, the present invention allows for more accurate frequency plans to be developed.

In a cellular network, each cell site includes at least one base station. In a GSM based cellular network each base station transmits information on at least one, and often times multiple carriers (also referred to as frequencies or channels). One of the channels assigned to each GSM base station includes a broadcast control channel (BCCH). The BCCH is used to provide configuration or control information to enabled GSM cellular receivers within the cell site. The configuration information, among other things includes the identification for the base station and channel structure information for the cell site. A cellular receiver must tune to and lock onto the BCCH of a base station upon entering a cell site. The BCCH identifies the control channels used by the base station by including this information in time slot zero the BCCH carrier.

Figure 3:
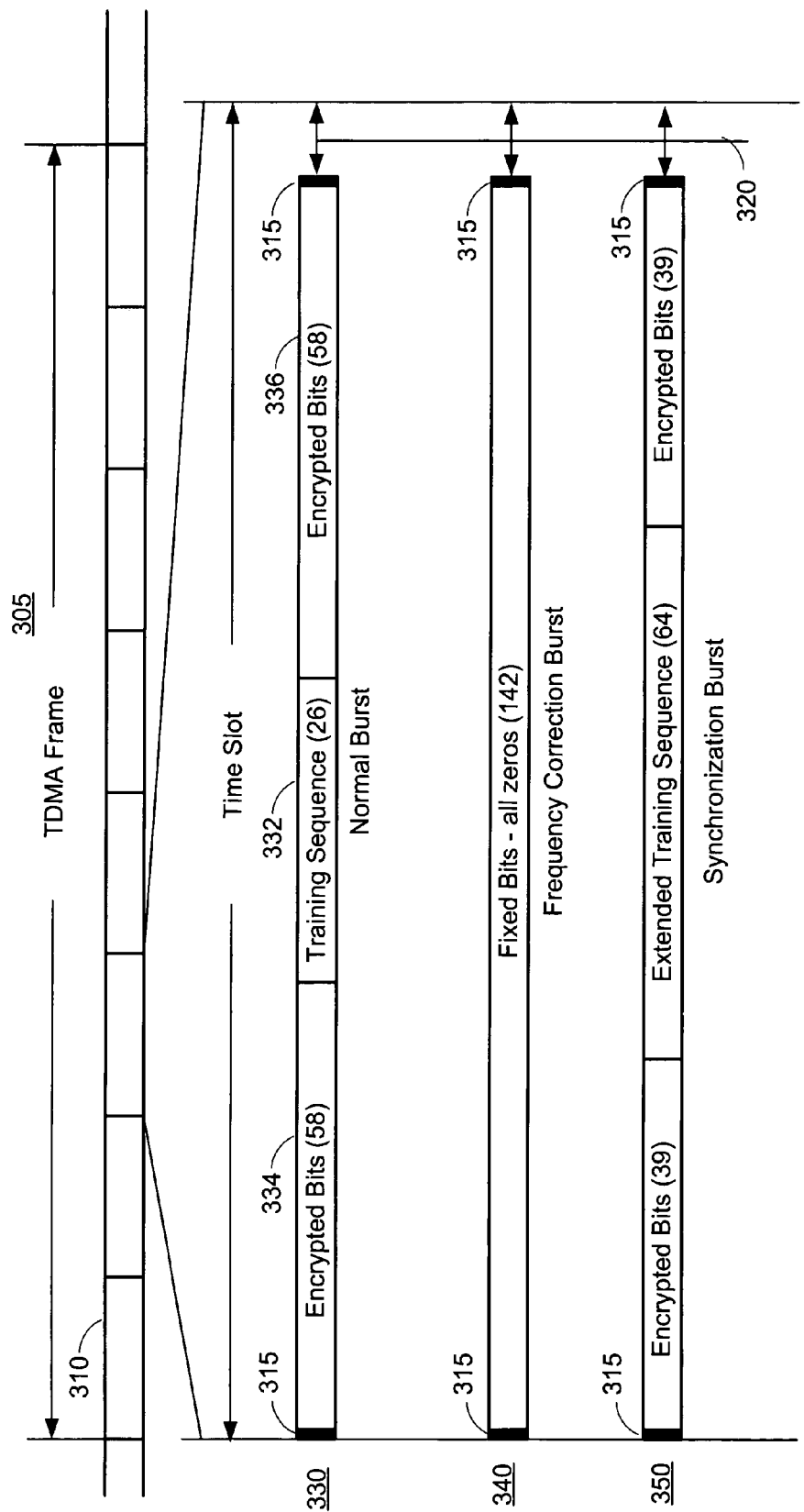
FIG. 3 is a timing diagram illustrating the various burst structures within a GSM system.

The data broadcast during a time slot is called a burst. Different channel types within the GSM architecture have different burst structures. FIG. 3 is a timing diagram illustrating the various burst structures within a GSM system. GSM systems transmit data using TDMA technology. A TDMA frame 305 includes multiple time slots 310. Each time slot in the GSM architecture includes 142 bits of data surround by three (3) tail bits 315 on each end of the data. On the trailing end of the data, a guard period of 8.25 bit periods 320 is provided. A normal burst 330 includes a 26 bit training sequence 332 preceded by, and followed by fifty-eight (58) encrypted bits 334 and 336. A fixed frequency correction burst 340 includes 142 bits of all zeros. A synchronization burst includes sixty-four (64) bit extended training sequence preceded by, and followed by thirty-nine (39) encrypted bits.

Each cell within a GSM system has one primary carrier and possible multiple secondary carriers. The BCCH resides in slot 0 of the primary carrier. The GSM BCCH and traffic channels (TCH) are configured as normal bursts. The frequency control channel (FCCH) uses a burst of all zeroes resulting in an unmodulated carrier of 1625/24 KHz (or approximately 67 KHz) above the center carrier. The SYNCH, another GSM channel, uses the synchronization burst. The sixty-four (64) bit training sequence is a known sequence and contains the base station color code, or BCC. To a cellular receiver, while moving between locations, the base stations are identified primarily by their BCCH carrier number and their BCC. The BCC is three bits long allowing for a total of eight (8) possible BCC values. In addition, the GSM specification utilizes a training sequence. The training sequence is a deterministic pattern that is based on one of the possible eight BCC values. One aspect of the present invention is a method to utilize the training sequence to identify the BCC, and thereby to identify the base station.

Figure 4:
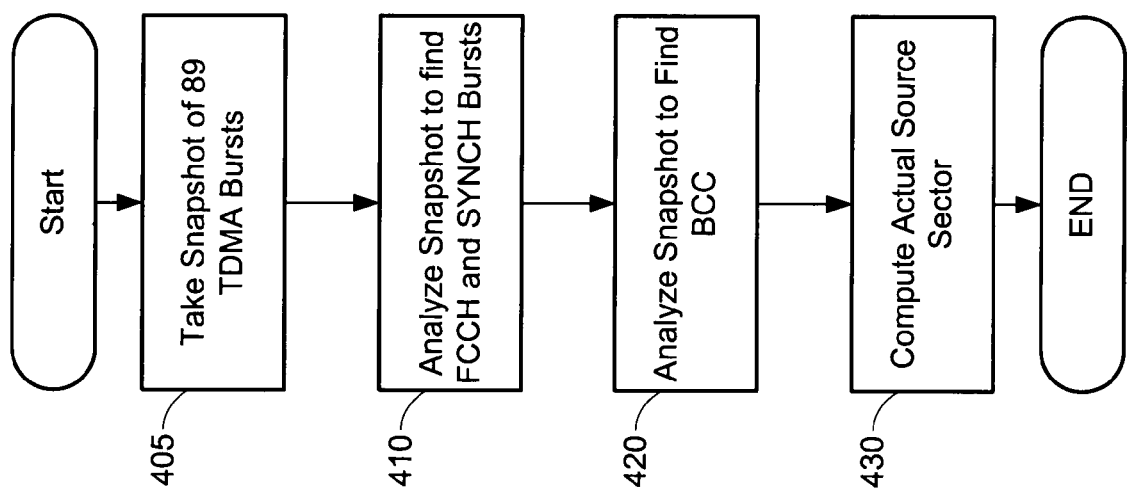
FIG. 4 is a flow diagram illustrating the operation of an exemplary embodiment of the present invention.

FIG. 4 is a flow diagram illustrating the operation of an exemplary embodiment of the present invention. Those skilled in the art will recognize that the timing and signal characteristics are described in accordance with current GSM specifications. Further, those skilled in the art will recognize that the present invention may be modified in accordance with changes to the GSM specifications or in accordance with alternative or new broadcast specifications without departing from the scope or intent of the present invention. Initially, the WSCT makes a snapshot of the received signal for eighty-nine (89) TDMA bursts 405. Based on the air interface protocol of the GSM architecture, an eight-nine (89) burst snapshot will include at least one SYNCH burst and one FCCH burst. Due to the fact that each TDMA burst is 0.577 milliseconds in duration, the snapshot will have a duration of 51.3 milliseconds. The analog to digital converter 225, in an exemplary embodiment, operates at fifty (50) million samples per second with each sample being twelve (12) bits. Thus, the entire snapshot is 30,807, 692 bits (3,850,962 bytes) in length.

The snapshot is then analyzed by the digital signal processor 235 to find the FCCH and SYNCH bursts 410. This task may be performed using a variety of techniques. One such technique is to perform a Fast Fourier Transform on the sample on pieces of the snapshot, each with a size slightly larger than a burst. Because the FCCH burst is a stream of zeroes, the carrier for the FCCH will appear to be an unmodulated signal at 67 kHz above the nominal frequency. By examining a small band around each carrier frequency (i.e., around 67 kHz above the nominal frequency) the FCCH can then be identified. For each carrier within the snapshot, the signal level and timing of the burst should be identified and recorded. It should be noted that more than one FCCH may appear per carrier in the snapshot.

Regardless of the technique used to find the FCCH and SYNCH bursts, the snapshot is generally demodulated or searched to find a BCCH. Within the GSM system, to ensure that a signal is always broadcast on the BCCH carrier, dummy bursts are sent on the BCCH carrier whenever there is no traffic channel information to be sent. The dummy burst is a known 156 bit sequence. Transmission of the dummy burst allows the ability to find the BCCH carrier and read its signal level in a high noise environment. The dummy burst is sent only on idle time slots of the BCCH carrier. Those skilled in the art will be aware that the dummy burst is a well known data sequence. Therefore it is generally easier to find or detect (demodulate) than other data on a carrier. Furthermore, since the dummy burst is only sent on the BCCH carrier, detecting the dummy burst is a clear indication that the BCCH carrier has been identified.

The snapshot may be analyzed to determine the base station color code (BCC) 420. The BCC is determined by comparing the training sequence of one or more Normal Bursts to the eight (8) possible training sequences. The BCC equals the training sequence code (TSC.) At this point in the process, timing has been determined for each BCCH carrier, the signal level and distortion of the BCCH carrier has been determined from the SYNCH and, if possible, the BCC has been determined. In the presence of noise, it may be difficult to identify the BCC of a signal. In embodiments of the present invention, it is not necessary to identify the color code to identify the carrier.

Finally, using the carrier frequency, the BCC and the timing of the FCCH, the process computes the actual source sector 430.

In an exemplary embodiment of the present invention, the analysis software assigns signal level measurements to the base stations within the cellular network. By using the BCC, the timing of the received signal, and the predicted signal levels for the base station, the reliability of assigning the signal level measurements can be increased. For instance, knowing the BCC of the received signal decreases the number of possible base stations that transmitted the received signal by a 7/8 ratio due to the fact that eight (8) possible BCC's can be received. In addition, measuring the delay or relative delay of a signal allows the analysis software to reduce the number of possible sources of the signal. Finally, by predicting the signal level of the various base stations and comparing the actual signal levels received with the predicted levels, the most likely source of a signal can be identified. Through the use of a reference file, the present invention may track expected signal timing, clock error, and other received signal traits to more accurately predict the source of a transmission.

An exemplary embodiment of the analysis software includes the ability to estimate receive signal levels of the base stations in response to changing the configuration of the base stations antenna. The analysis software estimates the signal level that would be received given changes in a base stations configuration. The software uses the change in predicted signal level from the two different configurations and applies that difference to the measured data to vie a predicted measured data.

Another aspect of the present invention uses the signal to total power received ratio to provide a technology independent estimate of the quality of the network design. This aspect of the present invention may also be used to determine areas within the network with the highest interference. Traditionally, interference is calculated in each area of a network based on the implemented frequency plan. This has been done due to the fact that the areas of interference change as the frequency plan changes. However, the present invention allows the system operator to quantify the areas of the network that are likely to have interference problems, regardless of the frequency plan. This aspect of the present invention involves, at each area within the cellular system, calculating the total power received from every base station in the cellular system. Next, the power of the strongest base station for each particular area is compared to the total power received for that particular area. The ratio of these values will range from 0 to 1, or negative infinity to zero when expressed in dB. Frequency assignments are independent of this calculation. The total power received in a location is not the actual power at that location on a given frequency, but rather the total power from all sectors regardless of there frequency assignment.

Figure 5:
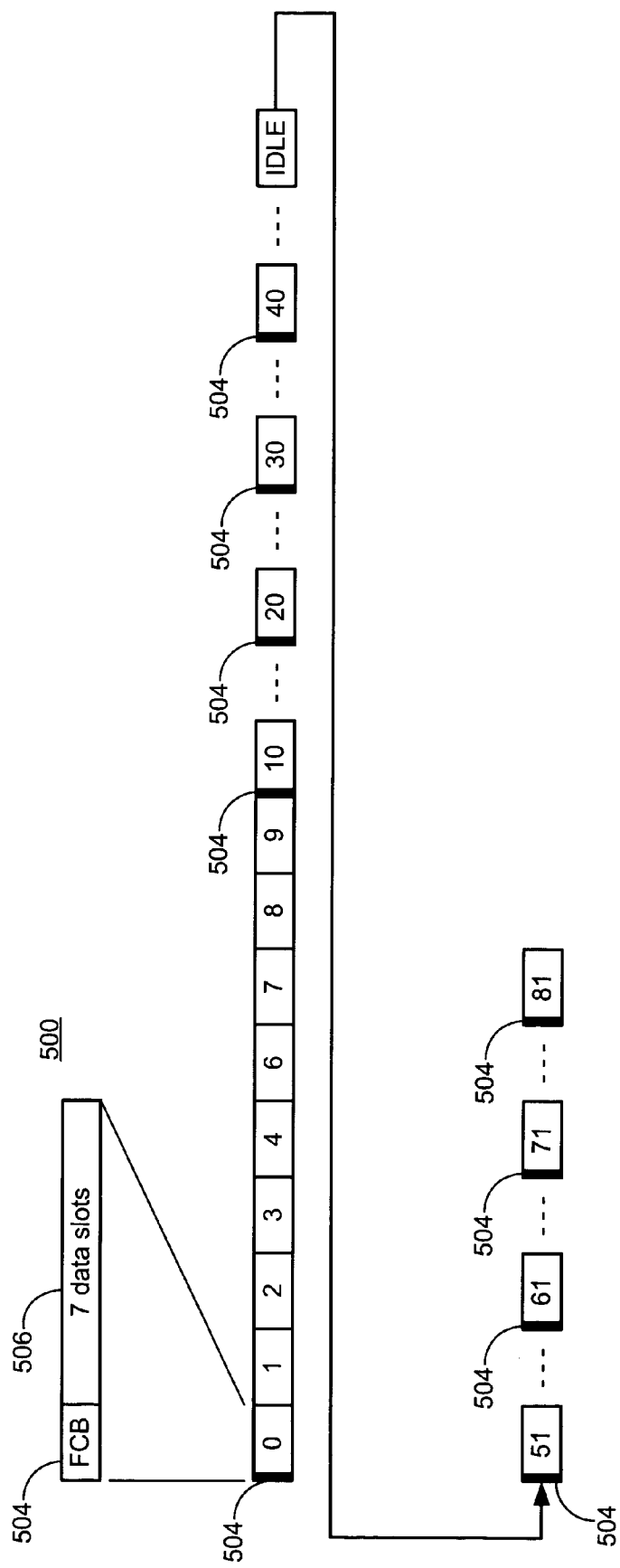
FIG. 5 is a timing diagram illustrating the FCCH detection aspect of the present invention.

FIG. 5 is a timing diagram illustrating the FCCH detection aspect of the present invention. The FCCH is transmitted on the BCCH and appears in slot zero of certain of the TDMA frames. An FCCH loaded TDMA frame 500 includes a frequency correction burst 504 and seven data slots 506. To detect the FCCH, 89 bursts of data are recorded, thereby ensuring that the FCB is detected. It is necessary to record 89 bursts due to the fact that the FCB appears only once in every 11 frames. Thus in frame 0, 10, 20, 30, and 40, the FCB appears in slot zero. Periodically, after frame 50, the GSM system will include an idle frame time in which a handoff or other functions can be performed. Thus, the FCB is resumed in frames 51, 61, 71, and 81, which are equivalent to frames 0, 10, 20, 30, and 40. To ensure that a recorded sample includes at least one FCB, the worst case scenario must be taken into account. Thus, 89 burst will include 11 frames and one extra time-slot. This will ensure that in the worst case scenario—beginning a recording that expands across an idle frame in the middle of the burst—at least one FCB is recorded. Traditionally, a mobile unit is provided with the BCC identifying the base station to be tuned to for receiving information. The mobile unit is then aware of which training sequence of the eight possible training sequences to look for. The present invention takes advantage of the fact that the training sequence identifies a particular base station. By capturing the training sequence and correlating the captured training sequence with the 8 possible training sequences, the BCC can be determined. Stated otherwise, the transmitting base station of the received signal can be identified.

In a GSM network with frequency hopping, most operators segregate a set of carriers for BCCH planning. Typically, this set includes between 12 and 18 GSM carriers. Regardless of the number of traffic carriers available to the operator, the number of BCCH carriers set aside determines the reuse factor for BCCH carriers. Even if the majority of mobiles are assigned to non-BCCH (hopping) carriers, the interference on the BCCH carrier is important to the functioning of a GSM network. Mobile devices need good BCCH signals to access the network, make neighbor measurements, and perform handover.

Ideally, a GSM operator would like to use the fewest possible number of carriers as BCCH carriers, because hopping carriers (traffic channel carriers) can be reused much more often and are more efficient from a traffic point of view. There is an engineering trade-off between fewer BCCH carriers—which yields more capacity and causes more interference—and more BCCH carriers which reduces interference but also reduces capacity. Within the scope of carrier-hopping, it can be assumed that there is interference on the BCCH carriers.

However, this does not fully explain the difficulty of performing proper measurements on a GSM network. One aspect of the present invention is to provide hardware that is capable of making comprehensive measurements of every sector in the network, not just find specific occurrences of interference because it can determine which sectors can reuse that are currently not reusing, thus increasing capacity. Accordingly, the hardware should be able to differentiate between two sectors on the same carrier, even when neither of these sectors is actually the serving sector in a given area.

Figure 6:
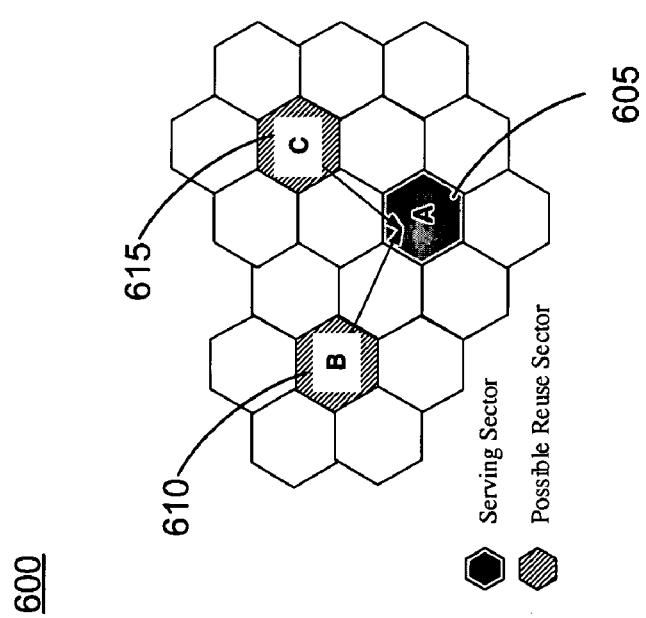
FIG. 6 illustrates an exemplary cell coverage area.

Referring now to FIG. 6, which illustrates an exemplary cell coverage area, in each part of the coverage area of Cell A 605, the signal level of every sector near Cell A 605 needs to be determined. In this example, Cell B 610 and Cell C 615 share the same BCCH carrier as each other, though not the same as Cell A 605. At the identified location in Cell A's 605 coverage, the test equipment should establish the signal level from Cells B 610 & C 615. When using traditional measurement methods, this determination is not possible because Cells B 610 and C 615 interfere with each other. These signals are not interference in the traditional sense, since neither Cell B 610 nor Cell C 615 is actually holding the call, but existing test equipment is not able to determine the signal levels from either sector.

Since there was never an attempt on the part of the frequency planner to limit interference between Cells B 610 and C 615 inside Cell A's 605 coverage area, it can be assumed that this type of interference will happen often, limiting capacity of the network.

There are several types of GSM optimization test equipment currently used. Those skilled in the art are familiar with the operation of the various test equipment currently in use. Most of this test equipment, such as a GSM mobile or a scanner, requires approximately a 9 dB Signal to Noise Ratio (SNR) to accurately decode the BSIC. In such equipment, if the SNR is below 7 dB, the BSIC cannot be decoded, and the current test equipment cannot determine the sources of interference.

A GSM scanner is a test system that rapidly decodes BSICs of GSM signals. In effect, GSM scanners are typically faster testing platforms than standard GSM mobiles, but they do not generally improve the sensitivity. Both scanner and mobile test systems read BSICs and decode them in approximately the same manner.

Consider again the cell layout shown FIG. 6. Table 1 below shows hypothetical signal levels at some point in Cell A's coverage area.

TABLE 1

Example Signal Levels

| Cell | Carrier # (plan during test) | Signal Level | Potential C/I | comment |
|---|---|---|---|---|
| Cell A | 100 | −75 dBm | NA | |
| Cell B | 106 | −81 dBm | 6 dB | No reuse |
| Cell C | 106 | −87 dBm | 12 dB | Good reuse |

The purpose of the testing is to determine whether Cell A 605 can reuse with Cell B 610 and/or Cell C 615. However, traditional test equipment cannot determine that Cell B 610 should not reuse and Cell C 615 can reuse, because it is not possible to decode the color codes of either of those sectors. Considering that the original frequency plan never attempted to reduce interference on carrier 106, in the coverage area of Cell A 605, this situation can be expected to regularly occur. Clearly, if an operator is using 15 BCCH carriers, then at each point existing test equipment does not have the potential to determine the signal levels of more than 15 sectors. Typically the number of determinable signal levels will be significantly fewer, because BSICs will not be detectable.

In a large GSM network with 500 sites and 1500 sectors, each BCCH carrier might be used between 80 and 120 times. Consequently, with traditional test equipment, accurately determining the source of interfering signals difficulties practically impossible.

Figure 7:
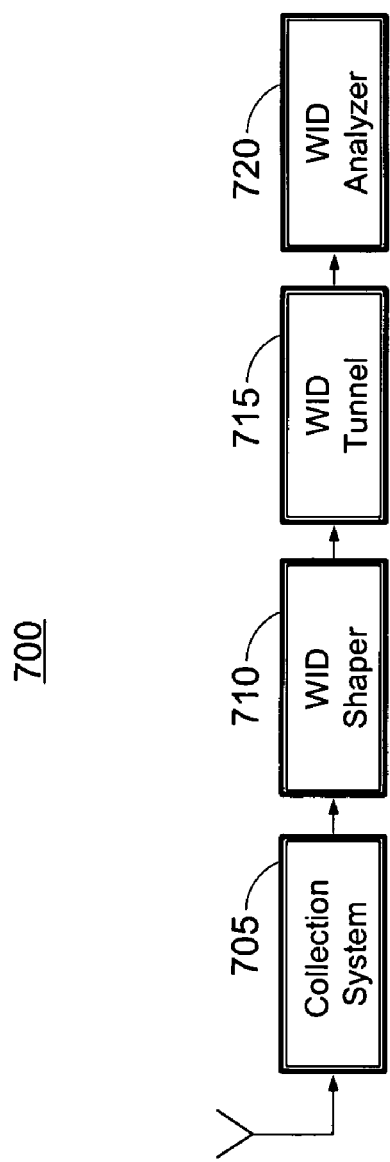
FIG. 7 is a block diagram of an exemplary embodiment of a measurement system according to an exemplary embodiment of the present invention.

FIG. 7 is a block diagram of a measurement system according to an exemplary embodiment of the present invention. The measurement system, also referred to as Wireless Interference Detection (WID) is composed of four tools, a collection system 705, a shaper 710, a tunnel 715, and an analyzer 720.

In an exemplary embodiment of the present invention, the WID system allows an operator to make comprehensive coverage measurements for all sectors throughout the network. Within the WID system, each of the four tools performs a separate function. The collection system 705 is a set of hardware that collects raw (unprocessed) RF measurement data in any 10 MHz range from 770 MHz to 2.4 GHz. The shaper 710 is comprised of digital signal processing (DSP) code that detects the existence and power of multiple BCCH carriers on each and every carrier. The tunnel 715 software determines the source (sector) of the detected BCCH carriers, using frequency, timing, and color code. Finally, the analyzer 720 is a set of software tools that allows an engineer to create frequency plans and analyze networks with the measured data.

According to an exemplary embodiment of the present invention, the collection system 705 is responsible for collecting wide-band RF measurements anywhere in a large frequency range. Physically it is composed of two hardware units: the RF front end and the collection computer.

Figure 8:
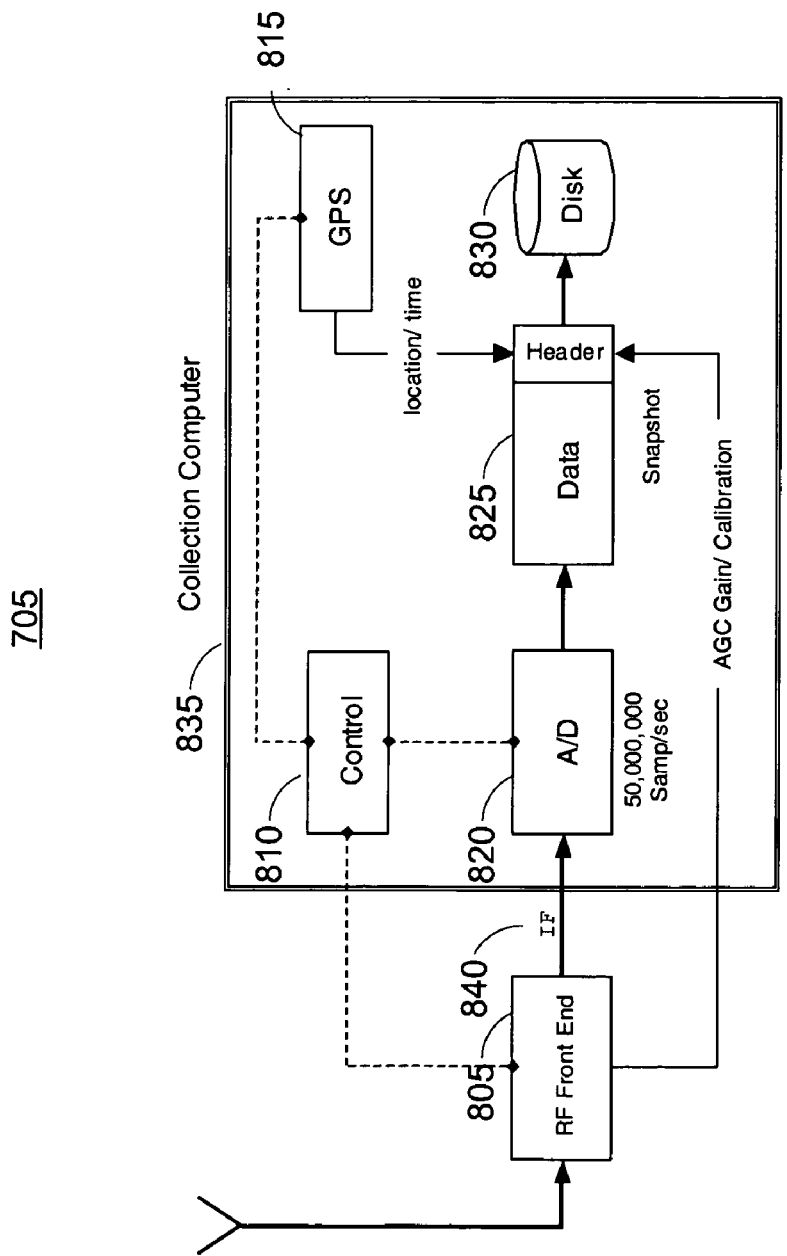
FIG. 8 is a block diagram illustrating an exemplary embodiment of a collection system in accordance with the present invention.

FIG. 8 is a block diagram illustrating an exemplary embodiment of a collection system in accordance with the present invention. In an exemplary embodiment of the present invention the collection system's 705 RF Front End 805 can tune in the range of 770 MHz to 2400 MHz. If multiple ranges are required, the RF front end should be capable of rapidly retuning anywhere in this range. In an exemplary system, the RF front end 805 can retune in less than 10 ms. The RF front end 805 bandwidth is preferably approximately 10 MHz. Generally, the IF signal is centered at 15 MHz, so that the desired signal is in a range from 10 to 20 MHz.

The RF Front-End 805 typically uses a double-conversion approach that minimizes down-conversion harmonics. In an exemplary embodiment of the present invention, the noise figure for the RF Front End 805 is approximately 8 dB for small input signals due to the use of two cascaded Variable Gain Control (VGC) amplifiers. The Data Collection Computer maintains optimal Analog-to-Digital (A/D) performance by controlling the VGC amplifiers, which in turn control the output signal level from the RF Front-End 805 to the A/D converters. The VGC amplifiers use internal voltage controllable attenuators to adjust the amplifier gain level.

In an exemplary embodiment of the present invention, the RF Front End 805 is optimized for a maximum input RF signal level of −12 dBm with minimal signal compression at −8 dBm. These input levels are based on the utilization of a 0 dB gain, 50 ohm telecommunication antenna.

An Automatic Gain Control (AGC) preamplifier gain in the front end is set before data recording is begun in the A/D converter. The AGC gain is set to provide a maximum output of 5 mVolts from the RF Front-End 805.

The collection system 705 includes a collection computer 835, which is responsible for controlling the RF Front End 805, an A/D converter 820, a GPS card 815, other navigation, if used, and for storing the raw RF measurements onto large hard disks 830. The raw RF measurements are analyzed to determine whether the RF transmission was sent from a particular cell.

The RF Front End 805 outputs an Intermediate Signal (IF) of approximately 10 MHz, which is digitized using the A/D converter 820. In an exemplary embodiment of the present invention, the A/D converter 820 is a CompuScope™ A/D operable at 50 Msamples/sec and 12 bit samples. Each sample (12 bits) has a range of ±2047. These values are relative voltage with 2047=+500 mV. Alternatively, other digitizers may be used in accordance with the present invention.

Figure 9:
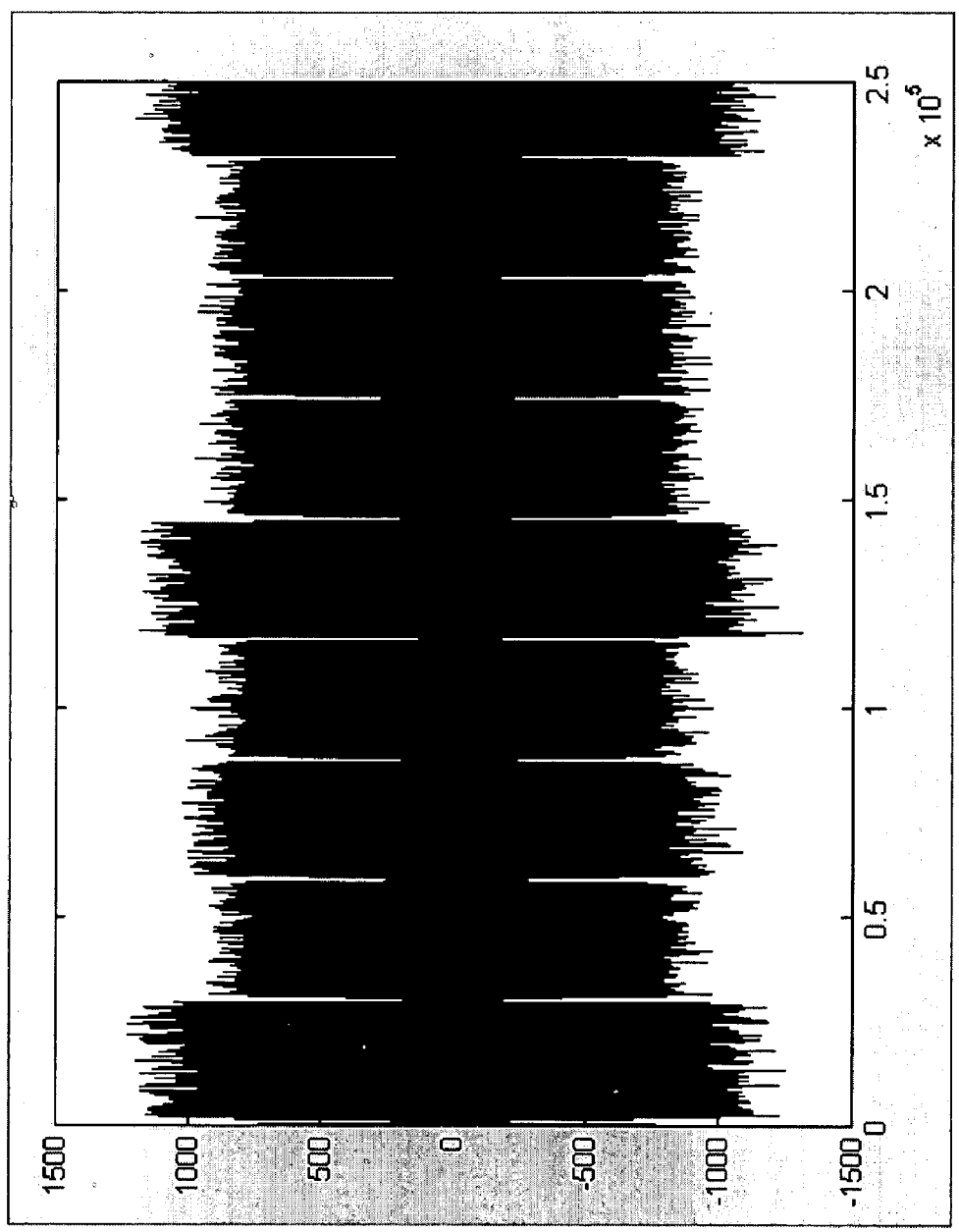
FIG. 9 illustrates subset of an exemplary snapshot.

A large set of these samples may be combined with header information to create a snapshot. FIG. 9 illustrates subset of an exemplary snapshot. In the snapshot shown in FIG. 9, the range of voltages into the A/D converter 820 is approximately ±300 mVolt (1200/2047*500 mVolt). This snapshot was taken in close proximity to a base station so that the majority of the signal entering the A/D converter 820 is from one cell site. With the strong signal strength from a single base station, it is easy to see the power-up and power-down of the timeslots. Those skilled in the art are capable of reading snapshots such as the one shown in FIG. 9, and in identifying the signal characteristics present. There are also two traffic channels turning on and off as can be determined by the fact that the first, fifth, and ninth bursts have more power than the others. The traffic channel energy is apparent because the snapshot is of the raw data and is unfiltered.

Along with the raw voltage data, an exemplary snapshot also contains a binary header with location, time, AGC gain, and calibration information.

The collection system includes a GPS unit 815. In an exemplary embodiment of the present invention, a DATUM™ GPS card is used as the GPS unit 815. Alternatively, any system capable of providing GPS data may be used. This card provides location and time information. The control software 810 uses one signal to start the A/D converter and to obtain a location and time stamp from the GPS card 815, simultaneously The WID Shaper 710 detects very weak BCCH carriers and determines BCCs. The data collection is more thorough and the processing of the data yields more complete and detailed information, which is then used to create an optimized frequency plan for the sector. The DSP process of the shaper 710 performs FCCH Detection, FCCH/SYNCH Correlation, and BCC Detection.

In an exemplary embodiment of the present invention, the FCCH burst consists of all zeros. With the type of modulation and filtering used in GSM, the FCCH appears as an unmodulated signal at 67.7 kHz above the center carrier. Because all of the energy of the FCCH is compressed into a narrow band, the FCCH can be easily detected within the power spectrum.

Figure 10:
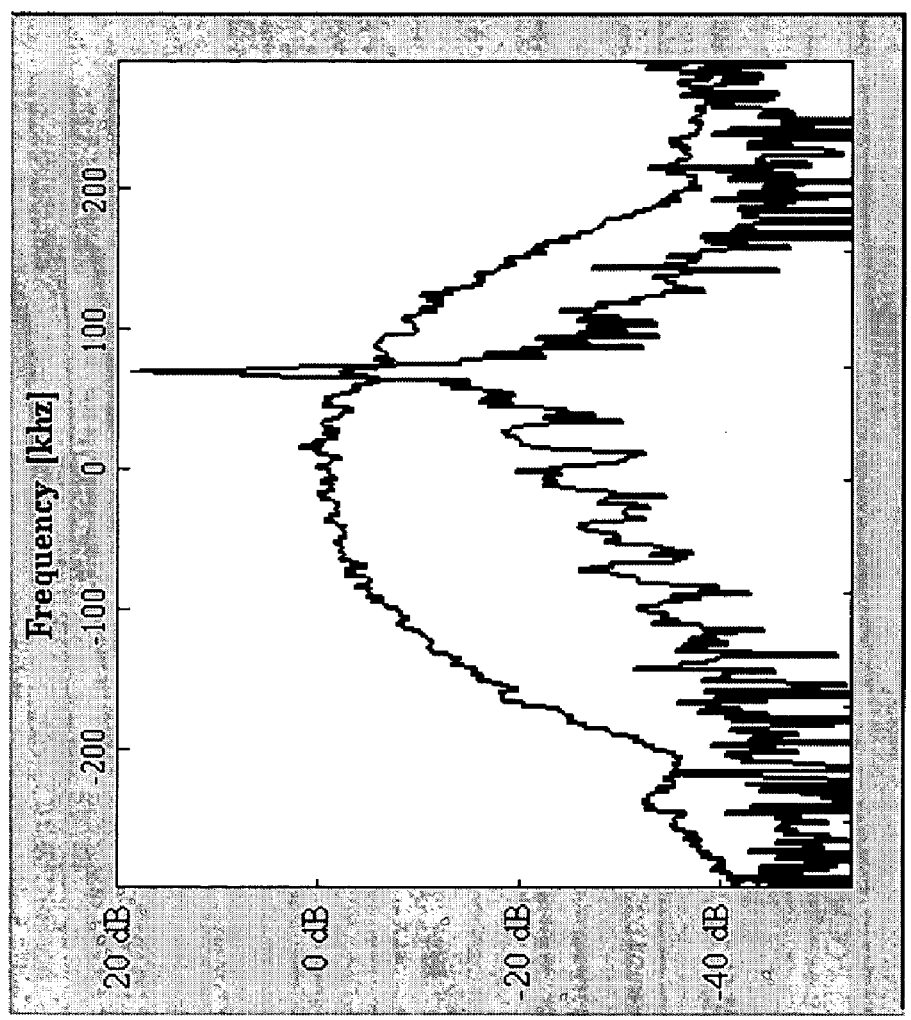
FIG. 10 illustrates the power spectrum of an FCCH burst.

FIG. 10 illustrates the power spectrum of an FCCH burst, which spikes above the carrier signal at 67.7 kHz. The energy spike can be compared to the average power spectrum of the rest of the burst, which consists of normal bursts, a SYNCH burst and dummy bursts.

From the FCCH detection phase, an approximate position for the FCCH burst may be determined in the snapshot. In order to determine color code, however, it is preferable to determine the exact timeslot format to the accuracy of one bit. The timeslot format is determined by correlating the snapshot against the FCCH burst and the SYNCH training sequence.

Figure 11:
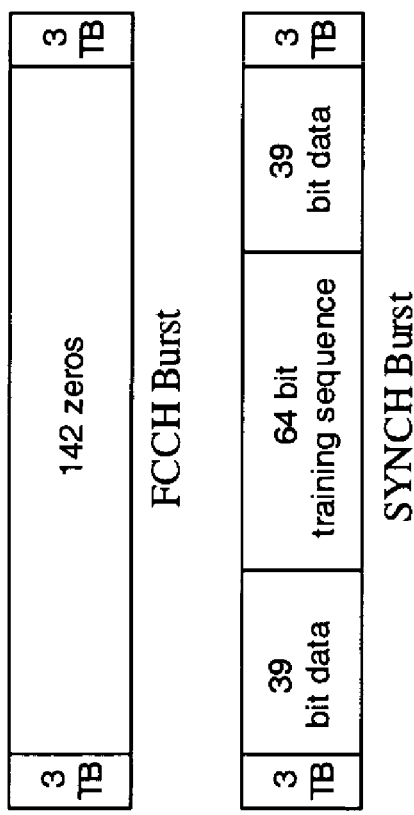
FIG. 11 is a timing diagram illustrating exemplary FCCH and SYNCH bursts.

The FCCH burst is defined in the GSM specifications as the modulation of all zeros. That is, the FCCH burst is composed of 142 zeros and tail bits, which are also zeros. The SYNCH burst contains information that is always changing. However, the SYNCH burst contains a fixed extra long training sequence as shown in FIG. 11. FIG. 11 is a timing diagram illustrating exemplary FCCH and SYNCH bursts.

Furthermore, in an exemplary embodiment of the present invention, the SYNCH burst occurs exactly eight time slots after the FCCH burst. The shaper 710 creates a template made of the FCCH burst and the SYNCH training sequence. The template is correlated against the recorded data which has been filtered and down-converted to baseband by the shaper 810.

Figure 12:
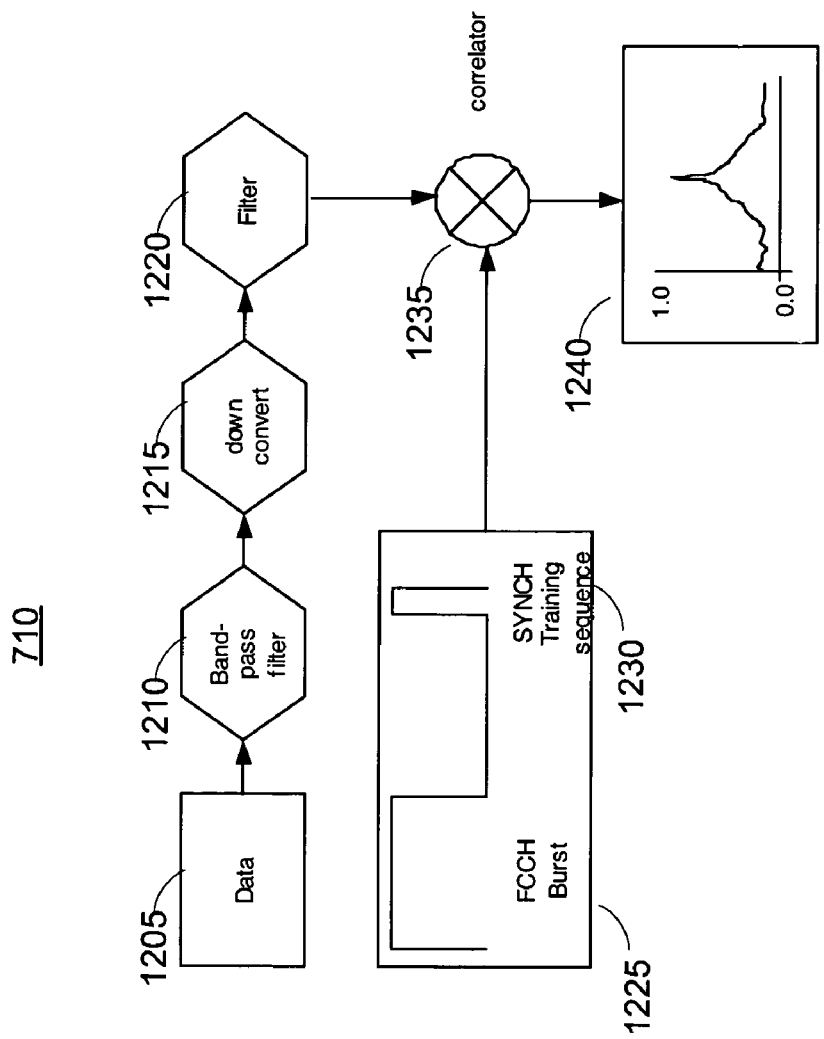
FIG. 12 is a block diagram illustrating the operation of the shaper.

FIG. 12 is a block diagram illustrating the operation of the shaper 710. As shown in FIG. 12, incoming data 1205 is filtered through a band-pass filter 1210, a down converter 1215, and another filter 1220 and then is correlated 1235 to the FCCH Burst 1225 and the SYNCH training sequence 1230 to produce a correlated data sequence 1240.

Because the FCCH burst is all zeros, correlation increases as the template and real FCCH overlap, creating correlation in a pyramid shape. The SYNCH training sequence 1230, however, does not present this type of correlation result. Therefore, a strong FCCH/SYNCH will have a correlation in the shape of a pyramid with a peak on top.

Figure 13:
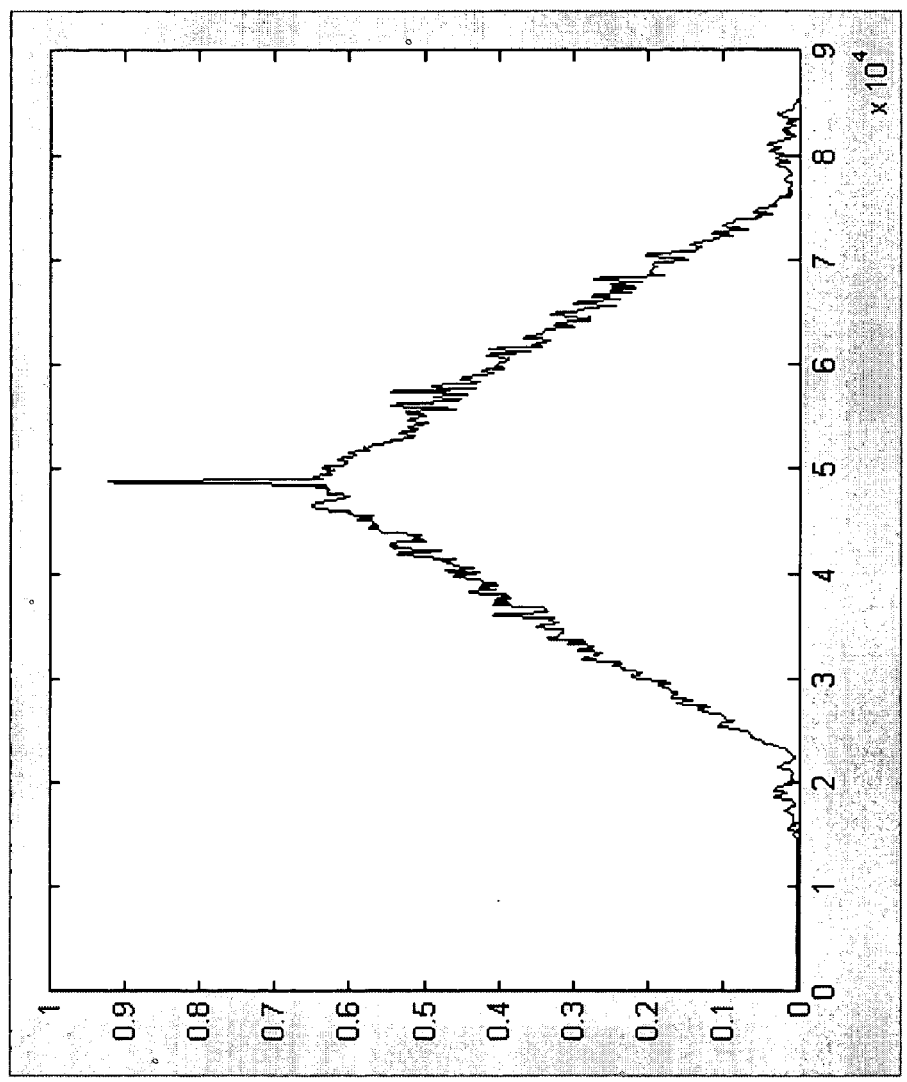
FIG. 13 illustrates the pyramid effect of correlating the FCCH burst for a strong signal.

FIG. 13 illustrates the pyramid effect of correlating the FCCH burst for a strong signal. In an exemplary embodiment of the present invention, the FCCH/SYNCH correlation algorithm of the shaper 710 provides an accurate timing structure of the data such that the exact position of each burst is known. In GSM the BCC sets one of eight training sequences that are used for normal bursts. The training sequences for normal bursts are 26 bits long as shown in FIG. 14.

In an exemplary embodiment of the present invention, the DSP algorithm in the shaper 710 correlates each of the eight possible training sequences against the location of the training sequence of the data for every burst that does not appear to be a dummy burst.

Figure 15:
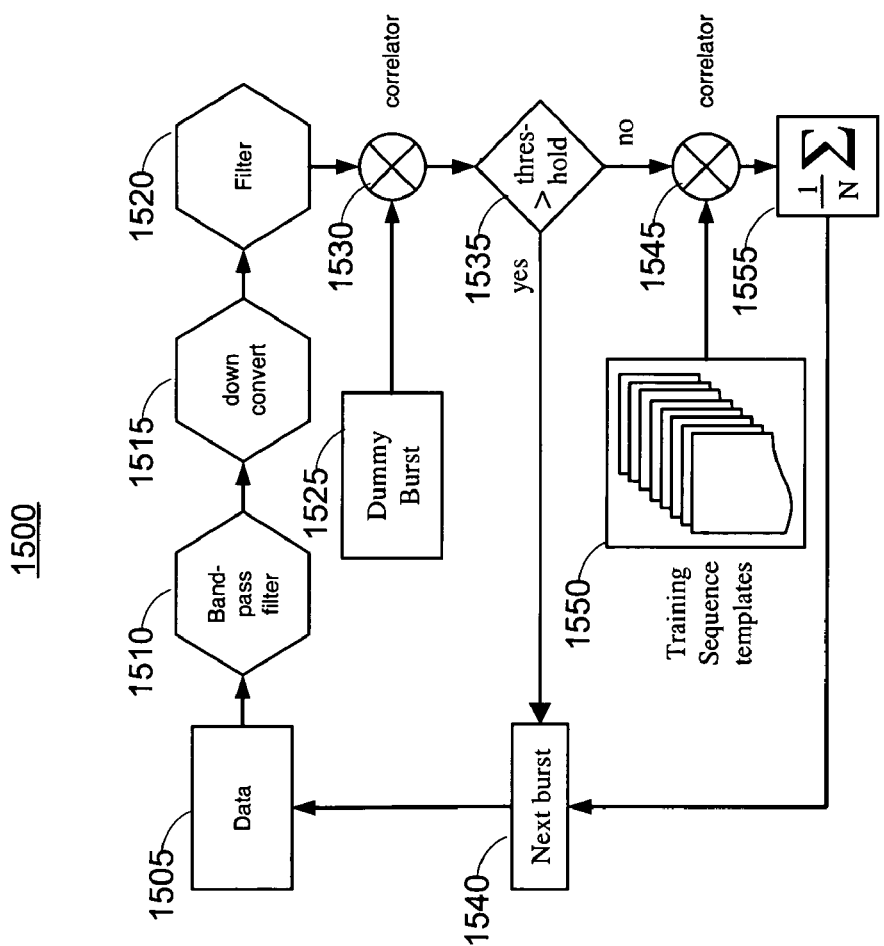
FIG. 15 is a block diagram a of correlation algorithm in an exemplary embodiment of the present invention.

FIG. 15 is a block diagram of a correlation algorithm in an exemplary embodiment of the present invention. As shown in FIG. 15, data 1505 is filtered through a band-pass filter 1510, a down converter 1515, a filter 1520, and correlated 1530 to the dummy burst 1525. If the data 1505 correlates to the dummy burst 1525 within an acceptable threshold, the next burst 1540 is analyzed. In an exemplary embodiment of the present invention, an acceptable threshold may. If the data 1505 does not sufficiently correlate to the dummy burst 1525, it is correlated 1545 to training sequence templates 1550. The correct training sequence is then selected by determining the sequence with the highest average correlation 1555. Very high processing gain is achieved through the averaging of the correlation results for as many as 86 bursts.

The output of the Shaper 710 DSP algorithm 1500 is a list of detected BCCH carriers, their signal levels and information used to determine the source of the signal. This information preferably includes, but is not limited to, the BCCH carrier, BCC, time of arrival, and location of measurement.

Figure 16:
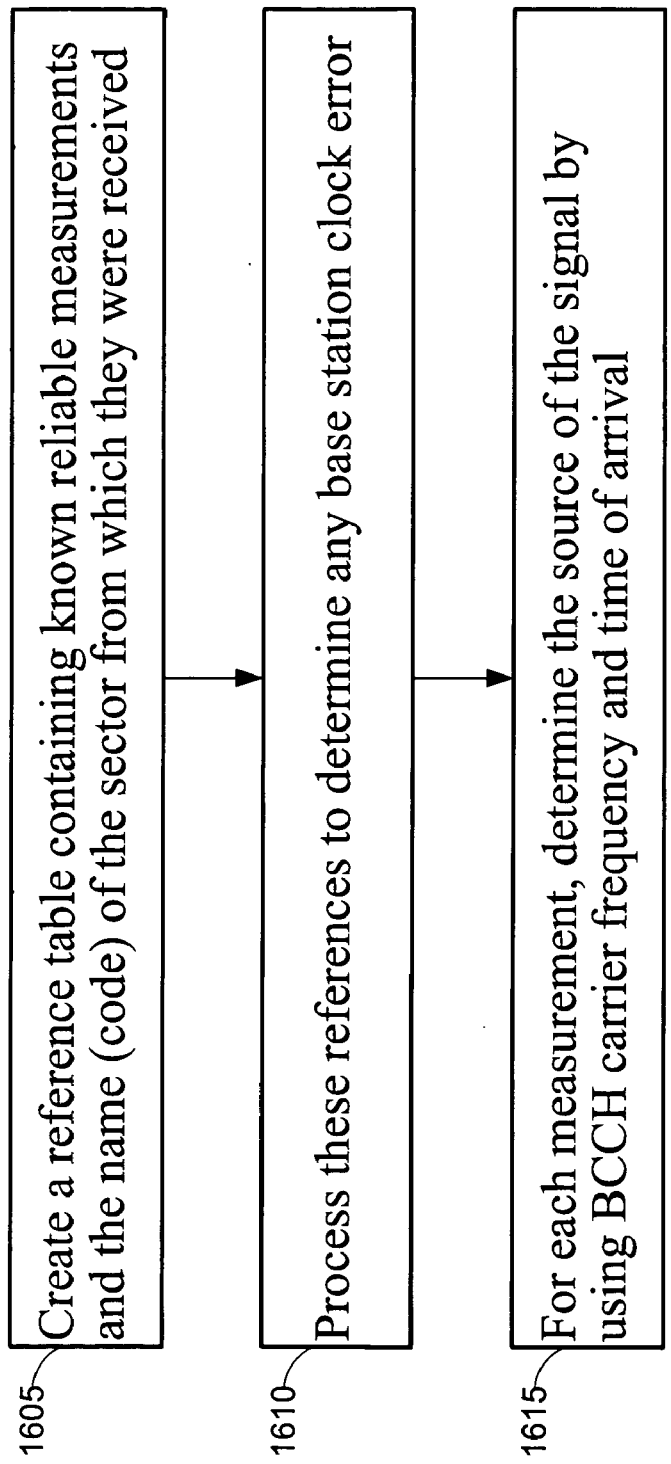
FIG. 16 is a flow diagram illustrating an assignment procedure in accordance with an exemplary embodiment of the present invention.

FIG. 16 is a flow diagram illustrating an assignment procedure in accordance with an exemplary embodiment of the present invention. As shown in FIG. 16, the assignment procedure involves (1) creating a reference table containing known reliable measurements and the name (code) of the sector from which they were received 1605; (2) processing these references to determine any base station clock error 1610; and (3) for each measurement determining the source of the signal by using BCCH carrier frequency and time of arrival 1615. Step 1615 is performed by comparing the measurement to the closest reference. If they match and it is the only one that does, then the measurement came from the sector with that reference.

The WID Analyzer 720 is a set of software tools that allows an engineer to process and view measurement information. The analyzer 720 includes an Automatic Frequency Planning Algorithm (AFP) used to create optimal BCCH and hopping plans.

In an exemplary embodiment of the present invention, a reference table is created containing known arrival times for FCCH bursts (i.e. BCCH carriers and their timing structure) and the sector that sent them.

In an exemplary embodiment of the present invention, the reference table is created using an algorithm that searches through a list of potential BCCH carriers, and chooses those that meet user defined criteria. Alternatively, a reference file may be created by taking measurements close to a transmission tower in each cell or sector. These measurements are highly reliable because the signal strength of the close by tower will be much stronger than any potentially interfering signals. Alternatively, the reference file may be created using known data. Additionally, the reference file may be created through statistical analysis of captured transmission data. By analyzing the data, one skilled in the art may identify highly reliable signals and assign them to the reference file.

The Reference Table is processed to determine if the timing of each reference assigned to a sector is consistent with the timing of other references assigned to that sector. Inconsistencies are reported to the user for investigation. Also, the references may be analyzed to determine any clock error at the base station. This clock error may be accounted for when making assignments.

In an exemplary embodiment of the present invention, raw RF measurements are stored during data capture. These measurements may then be analyzed to determine the cell from which the RF signal was sent. This determination is made by comparing the time data with data in the reference file. In an exemplary embodiment of the present invention, one may determine whether two signals originated from the same cell by calculating whether the FCCH burst occurred in the correct frame with the correct color code. For example, the FCCH burst is guaranteed to reoccur ever 51 frames and will also reoccur every 10 or 11 frames (depending on the presence of the idle frame). Accordingly, using a known reference in the reference file, one may determine whether a later FCCH burst likely was sent from the same cell. In an exemplary embodiment of the present invention, the system determines that the FCCH burst was sent from the same cell if it occurred in a time slot corresponding to a multiple of 51 frames later. Additionally, the system may determine that an FCCH burst occurring 10, 11, 20, 21, 30, 31, 40, or 41 time slots before or after an FCCH burst in the reference file.

Preferably, the system first narrows the field of potential cells by identifying the cells that broadcast on the same frequency as the received burst. Then, using the timing of the FCCH burst, the system identifies a most likely, or a set of likely, transmitting cells.

When assigning measurements, an exemplary embodiment of the present invention may require that the time of arrival of the FCCH burst is consistent with the reference closest in time with the candidate measurement given the (1) calculated clock error of the sector; (2) margin given the accuracy of our time measurement; and (3) difference in distance between the reference and the measurement to take into account the speed of light.

The system may also estimate the power in each FCCH burst (BCCH carrier) by looking at the peak power from the FCCH detection. The system may create a metric called Bandpow Ratio. This is calculated by taking the peak power and dividing by the power across the carrier. Accordingly, the denominator used to divide is the total power from ±~50 KHz around the center frequency. A strong FCCH burst would show a high peak power and a low power across the band, thus a high Bandpow Ratio. The system may also use the Bandpow Ratio to make power estimation more accurate.

The BCCH time slot (time slot 0) on the BCCH carrier generally has a repeating structure of 51 frames. Frames 0, 10, 20, 30, 40 contain the FCCH burst. Frame 50 is an idle frame. Following Frame 50, the cycle repeats. This means that whenever there is an FCCH burst, there is another 51 frames later regardless of when the idle frame is. To get better sensitivity in the FCCH detection phase, the system takes RF signal data spaced by exactly 51 frames, either by taking two snapshots spaced by 51 frames or by taking a very long snap shot of more than 51 frames. The FFTs may be combined in such a way that real FCCH burst peaks will combine while random peaks will not.

In a synchronized network, sectors may use identical timing structures. Thus, their references would be the same. In such a network, assignment may be made by calculating the signal delay given the speed of light.

The dummy burst 1525 is a known set of 148 bits and is sent on the BCCH carrier during time slots 1-7 whenever there is not user data or voice to send. This means that there could be very many of them during a snapshot, which may, for example, contain 89 bursts. By correlating against a known dummy burst, very accurate timing can be obtained for the BCCH carrier. This would allow assignment to be made even on a synchronized network by using propagation delay.

Timing advance data may be sent to a mobile device on a GSM network. When the mobile device moves further away from a cell site, signals are received with greater delay. Since the mobile device get its timing structure from what it receives, it may send its data or information late. Due to the distance, the signal may be even more delayed, thus arriving in the next time slot. An exemplary embodiment of the present invention uses timing advance to take into account the signal path length, which can be more than the distance between the mobile and the site, if the main signal is the result of a reflection.

While the present invention has been described in detail with particular reference to exemplary embodiments thereof, it will be understood that variations and modifications can be effected within the scope of the invention as defined in the appended claims.

What is claimed is:

1. A method of detecting a transmission from a primary cellular transmitter, the primary cellular transmitter transmitting on at least one channel frequency and being located in the vicinity of one or more secondary cellular transmitters, the method comprising the steps of:
    receiving a first stream of transmission data having a first received signal frequency at a first reception location for a first period of time;
    identifying the first signal frequency of the first stream of transmission data;
    correlating the transmission data against a signal template to identify a first FCCH burst frame;
    identifying first FCCH time data corresponding to the first FCCH burst frame; and
    comparing the first signal frequency of the first stream of transmission data and the first FCCH time data to a reference file to determine one or more probable transmission cells.

2. The method of claim 1, where the reference file comprises data entries representative of reference signal frequency and reference FCCH time data for a plurality of transmission cells.

3. The method of claim 2, wherein the step of comparing the first signal frequency of the first stream of transmission data and the first FCCH time data to a reference file to determine a probable transmission cell comprises the steps of:
    identifying each transmission cell in the reference file using substantially the same frequency as the first received signal frequency; and
    analyzing the reference FCCH time data for each cell using substantially the same frequency as the first received signal frequency to determine transmission cells with reference FCCH time data corresponding to the first FCCH time data.

4. The method of claim 3, wherein the FCCH time data corresponds to the first FCCH time data if the first FCCH time data represents a time frame occurring a multiple of 51 time frames apart from the reference time data.

5. The method of claim 3, wherein the FCCH time data corresponds to the first FCCH time data if the first FCCH time data represents a time frame occurring 10 time frames from a time frame occurring a multiple of 51 time frames apart from the reference time data.

6. The method of claim 3, wherein the FCCH time data corresponds to the first FCCH time data if the first FCCH time data represents a time frame occurring 11 time frames from a time frame occurring a multiple of 51 time frames apart from the reference time data.

7. The method of claim 3, wherein the FCCH time data corresponds to the first FCCH time data if the first FCCH time data represents a time frame occurring 20 time frames from a time frame occurring a multiple of 51 time frames apart from the reference time data.

8. The method of claim 3, wherein the FCCH time data corresponds to the first FCCH time data if the first FCCH time data represents a time frame occurring 21 time frames from a time frame occurring a multiple of 51 time frames apart from the reference time data.

9. The method of claim 3, further comprising the steps of:
    if more than one transmission cell is identified for which the reference FCCH time data corresponds to the first FCCH time data,
        identifying first geographic location data associated with the first reception location; and
        comparing the first geographic location data with location data associated with each identified transmission cell to determine a most probable transmission cell.

10. The method of claim 1, wherein the step of identifying first location data comprises receiving location data from a GPS unit.

11. The method of claim 1, where the first period of time is of sufficient duration to record sixty-two frames of transmission data.

12. The method of claim 1, wherein the signal template comprises an FCCH Burst and a SYNCH training sequence.

13. The method of claim 1, wherein the step of identifying time data corresponding to the first period of time comprises receiving time data from a GPS unit.

14. A system for detecting a transmission from a primary cellular transmitter, the primary cellular transmitter transmitting on at least one channel frequency and being located in the vicinity of one or more secondary cellular transmitters, the system comprising:

an RF front end adapted to receive a first stream of transmission data having a first signal frequency at a first reception location for a first period of time;

the RF front end further adapted to identifying the first signal frequency of the first stream of transmission data;

a shaper adapted to correlate the transmission data against a signal template to identify a first FCCH burst frame;

the shaper further adapted to identify first FCCH time data corresponding to the first FCCH burst frame; and an analyzer adapted to compare the first signal frequency of the first stream of transmission data and the first FCCH time data to a reference file to determine a probable transmission cell.

15. The system of claim 14, wherein the reference file comprises data entries representative of reference signal frequency and reference FCCH time data for a plurality of cells.

16. The system of claim 14, wherein the analyzer is further adapted to:

identify each cell in the reference file that uses substantially the same frequency as the first signal frequency; and analyze the reference FCCH time data for each cell using substantially the same frequency as the first signal frequency to determine transmission cells with reference FCCH time data corresponding to the first FCCH time data.

17. The system of claim 16, wherein the FCCH time data corresponds to the first FCCH time data if the first FCCH time data represents a time frame occurring a multiple of 51 time frames apart from the reference time data.

18. The system of claim 16, wherein the FCCH time data corresponds to the first FCCH time data if the first FCCH time data represents a time frame occurring 10 time frames from a time frame occurring a multiple of 51 time frames apart from the reference time data.

19. The system of claim 16, wherein the FCCH time data corresponds to the first FCCH time data if the first FCCH time data represents a time frame occurring 11 time frames from a time frame occurring a multiple of 51 time frames apart from the reference time data.

20. The system of claim 16, wherein the FCCH time data corresponds to the first FCCH time data if the first FCCH time data represents a time frame occurring 20 time frames from a time frame occurring a multiple of 51 time frames apart from the reference time data.

21. The system of claim 16, wherein the FCCH time data corresponds to the first FCCH time data if the first FCCH time data represents a time frame occurring 21 time frames from a time frame occurring a multiple of 51 time frames apart from the reference time data.

22. The method of claim 14, wherein the signal template comprises an FCCH Burst and a SYNCH training sequence.

* * * * *

/

(12) EX PARTE REEXAMINATION CERTIFICATE (7265th)
United States Patent
Sanders et al.

(10) Number: US 7,301,920 C1
(45) Certificate Issued: *Dec. 22, 2009

(54) SYSTEM AND METHOD FOR IDENTIFYING CO-CHANNEL INTERFERENCE IN A RADIO NETWORK

(75) Inventors: Alan David Sanders, Atlanta, GA (US); Perry Simon Lewars Linder, Chevy Chase, MD (US); Dhaval Dave', Atlanta, GA (US)

(73) Assignee: Telecom Network Optimization, Inc., Atlanta, GA (US)

Reexamination Request:
No. 90/010,321, Oct. 16, 2008

Reexamination Certificate for:
Patent No.: 7,301,920
Issued: Nov. 27, 2007
Appl. No.: 10/694,449
Filed: Oct. 27, 2003

( * ) Notice: This patent is subject to a terminal disclaimer.

Related U.S. Application Data

(63) Continuation-in-part of application No. 09/638,921, filed on Aug. 15, 2000, now Pat. No. 6,754,487.
(60) Provisional application No. 60/421,397, filed on Oct. 25, 2002.

(51) Int. Cl.
*H04Q 7/00* (2006.01)

(52) U.S. Cl. .................. 370/328; 370/332; 370/350
(58) Field of Classification Search .................. None
See application file for complete search history.

(56) References Cited

U.S. PATENT DOCUMENTS

| 6,754,487 | B1 | 6/2004 | Sanders et al. |
| 6,931,235 | B2 | 8/2005 | Kline et al. |
| 7,013,113 | B2 | 3/2006 | Dickey |

*Primary Examiner*—Colin M Larose

(57) ABSTRACT

The present invention is directed toward a system and method for identifying co-channel interference in a radio network. In an exemplary method according to the present invention, a first stream of transmission data having a first received signal frequency at a first reception location for a first period of time is received. Further, the first signal frequency of the first stream of transmission data is identified. Then the transmission data is correlated against a signal template to identify a first FCCH burst frame. Then, first FCCH time data corresponding to the first FCCH burst frame is identified and the signal frequency of the first stream of transmission data and the first FCCH time data is compared to a reference file to determine one or more probable transmission cells.

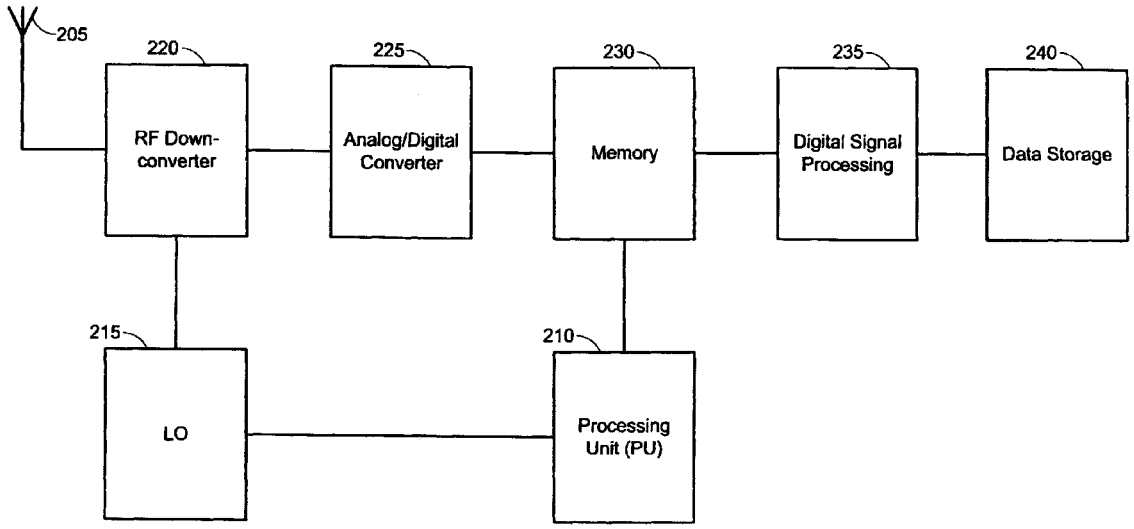

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

Only those paragraphs of the specification affected by amendment are printed herein.

Column 1, lines 8–13:

This application [is based on and] claims [the] priority [date of] *under 35 U.S.C. § 119(e) to* U.S. Provisional Application Ser. No. 60/421,397, entitled "SYSTEM AND METHOD FOR IDENTIFYING CO-CHANNEL INTERFERENCE IN A RADIO NETWORK", filed on Oct. 25, 2002, which is incorporated by reference in its entirety as if fully set forth herein, *and is a Continuation-in-Part of and claims priority under 35 U.S.C § 120 to U.S. patent application Ser. No. 09/638,921, entitled "RADIO NETWORK TEST ANALYSIS SYSTEM", filed Aug. 15, 2000.*

AS A RESULT OF REEXAMINATION, IT HAS BEEN DETERMINED THAT:

The patentability of claims 1–22 is confirmed.

New claims 23–31 are added and determined to be patentable.

*23. The method of claim 1, wherein the reference file contains base station color codes.*

*24. The method of claim 1, wherein the reference file contains signal data for transmission cells for which the base station color were decoded.*

*25. The method of claim 1, wherein the reference file contains data uniquely identifying each of the one or more probable transmission cells.*

*26. The method of claim 1, wherein the reference file is created prior to receiving the first stream of transmission data.*

*27. The method of claim 1, wherein each entry in the reference file for a transmission cell is created from measurements taken in proximity to the base of a transmission tower associated with the transmission cell.*

*28. The method of claim 1, wherein the comparison occurs after all streams of transmission data for a test drive data have been received.*

*29. The method of claim 1, wherein determining one or more probable transmission cells of the first stream of transmission data comprises comparing the first FCCH time data to time data for one or more transmission cells in the reference file.*

*30. The method of claim 14, the shaper further adapted to create a template from an FCCH burst frame and a SYNCH training sequence and correlate the template against a first stream of transmission data filtered and down-converted to baseband by the shaper.*

*31. The method of claim 14, the shaper further adapted to output a list of detected BCCH carriers, signals levels of the BCCH carriers, and information used to determine each source of each signal containing a BCCH carrier.*

\* \* \* \* \*